UNITED STATES PATENT OFFICE.

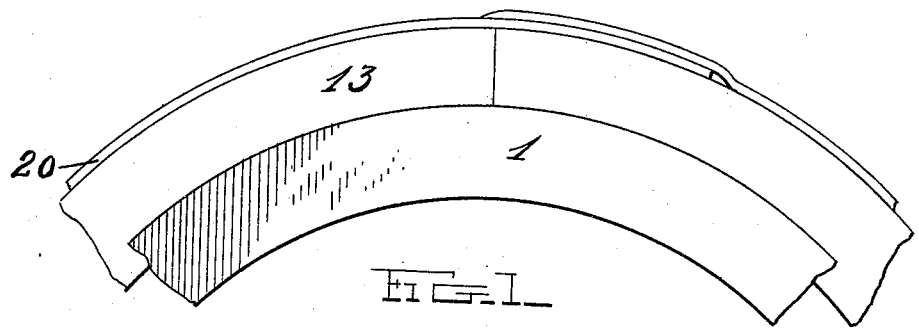
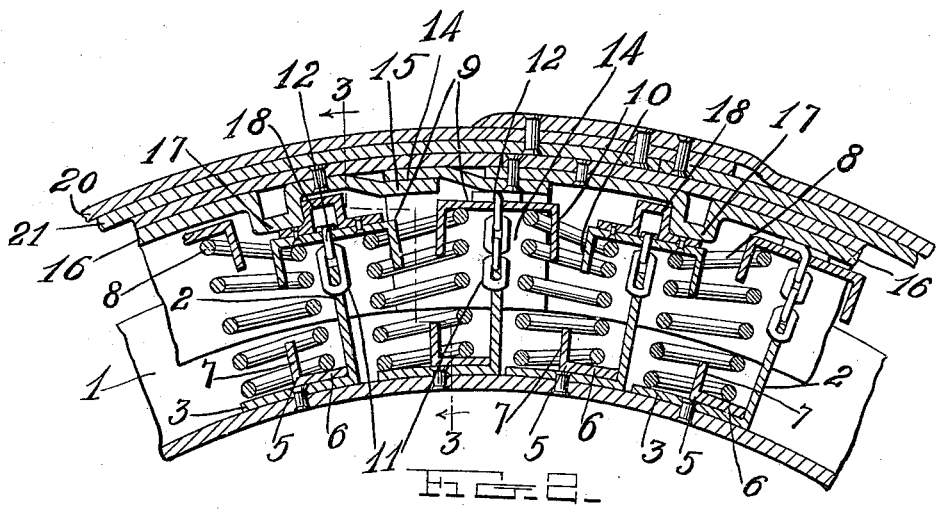
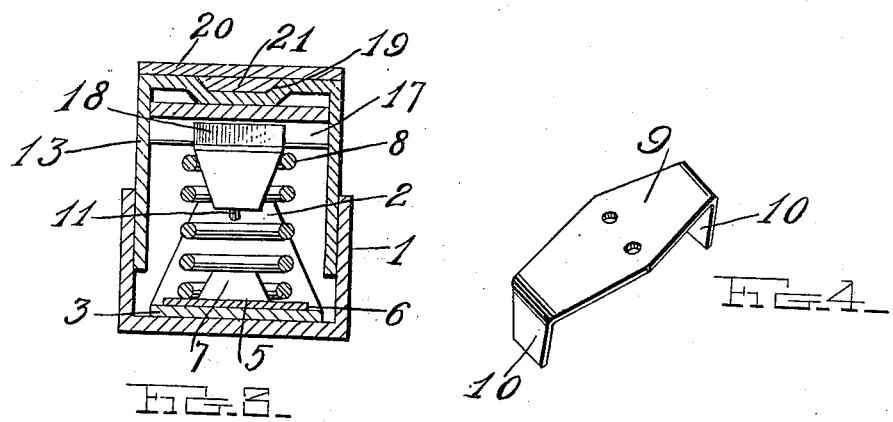

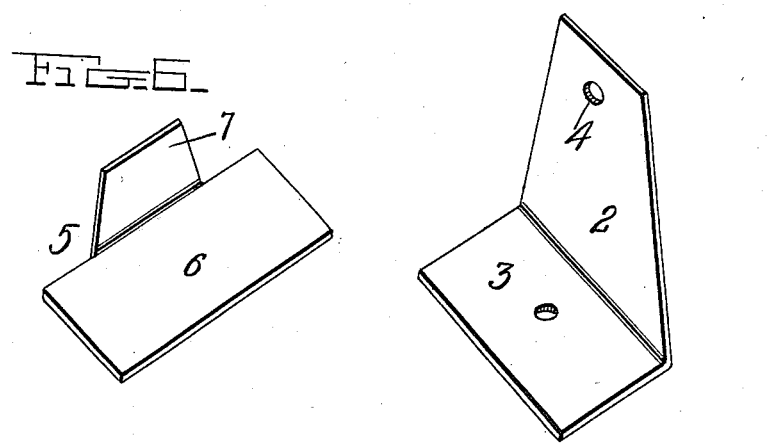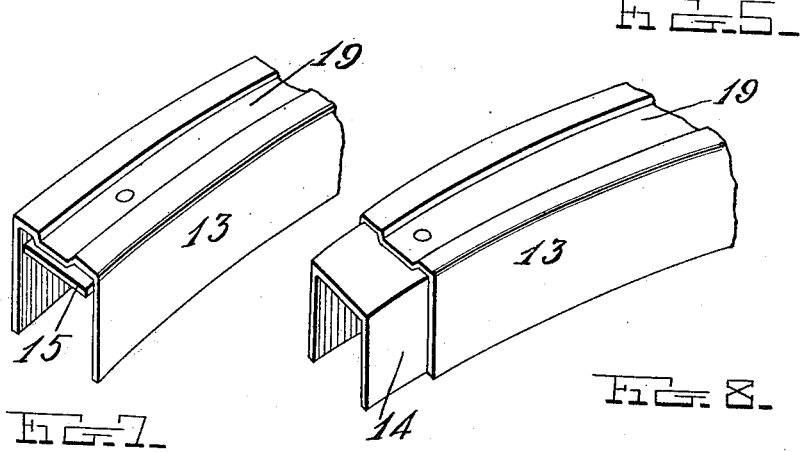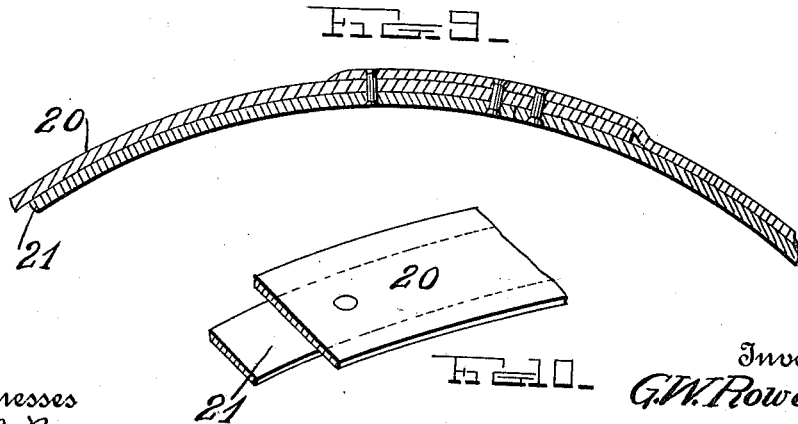

GEORGE W. ROWELL, OF PORTALES, TERRITORY OF NEW MEXICO.

RESILIENT TIRE.

995,573.                Specification of Letters Patent.     Patented June 20, 1911.

Application filed December 5, 1910. Serial No. 595,753.

*To all whom it may concern:*

Be it known that I, GEORGE W. ROWELL, a citizen of the United States, residing at Portales, in the county of Roosevelt and Territory of New Mexico, have invented certain new and useful Improvements in Resilient Tires; and I do declare the following to be a full, clear, and exact description of the invention, such as will enable others skilled in the art to which it appertains to make and use the same.

This invention relates to improvements in resilient tires for vehicle wheels.

One object of the invention is to provide a resilient tire having an improved construction and arrangement of springs and means for operatively holding the same in position whereby when applied to a wheel all of the advantages of a pneumatic tire are obtained without the disadvantages possessed by the latter.

Another object is to provide a tire of this character which will be strong and durable in construction, efficient and reliable in operation and which may be detachably applied to or made part of a wheel.

With these and other objects in view, the invention consists of certain novel features of construction, combination and arrangement of parts as will be more fully described and particularly pointed out in the appended claims.

In the accompanying drawings: Figure 1 is a side view of a portion of a tire constructed in accordance with my invention; Fig. 2 is a vertical section through the same; Fig. 3 is a vertical cross section on the line 3—3 of Fig. 2; Fig. 4 is a detail perspective view of one of the outer spring holding plates; Fig. 5 is a similar view of one of the inner spring holding plates; Fig. 6 is a similar view of one of the spring guides; Fig. 7 is a perspective view of one end of one of the outer sections of the tire casing; Fig. 8 is a similar view of the adjoining end of the outer section of the outer casing; Fig. 9 is an enlarged vertical longitudinal section through the joined ends of the clamping band of the tire showing the manner in which the ends are secured together; Fig. 10 is a detail perspective view of a portion of the clamping band and reinforcing strip for holding the sections of the outer casing together.

Referring more particularly to the drawings, 1 denotes the inner casing of the tire, said casing being preferably formed of stiff sheet metal and channel shaped in cross section. Arranged in the inner casing 1 is a series of inner spring holding plates 2 said plates having right angularly bent inner ends 3 which are riveted or otherwise rigidly secured to the bottom or inner wheel of the casing 1 as shown. The ends 3 of the plates form seats for a series of coiled springs hereinafter described, while the outer portions of the plates project radially from the inner wall of the casing 1 and have formed in their outer ends apertures 4. On the seats formed by the ends 3 of the plates 2 are spring guides 5 which may be secured to the seats or loosely engaged therewith as shown. The guides 5 comprise transversely disposed base plates 6 which engage the seats 3 and are of a length corresponding to the width of the space between the sides of the channel shaped casing 1, with the inner surface of which the ends of the base plates are engaged and the guides thus held against lateral movement in the casing. On the plates 6 of the spring guides are formed upwardly projecting lugs or flanges 7 with which are engaged the lower ends of the springs hereinafter described.

Arranged in the inner section of the casing 1 between the inner spring holding plates 2 are a series of coiled springs 8 the inner ends of which engage the seats formed by the ends 3 of the plates 2 and the lugs 7 of the spring guides as shown whereby said inner ends of the springs are held against lateral or sidewise movement in the section 1 of the casing. Engaged with the outer ends of the springs are a series of outer spring holding and spacing plates 9. The plates 9 have their opposite ends bent inwardly at right angles and tapered to form spring engaging lugs 10, the lugs of each of said plates engaging the upper ends of two adjoining springs, said springs being thus connected together by the plates 9 as shown. The plates 9 are held in operative engagement with the outer ends of the springs and the latter confined in the channel shaped casing 1 of the tire by a series of chains 11, the inner ends of which are engaged with the apertures 4 in the outer ends of the inner spring holding plates 2, while their outer ends are connected with loops 12 arranged in the outer plates 9.

Arranged around and over the outer portions of the springs 8 and the spring holding and spacing plates 9 is a channel shaped outer casing 13, the inner edges of which enter the inner channel shaped casing 1 and slidably engage the inner surface of the side walls of said inner casing as shown. The outer casing 13 is preferably formed in two semi-circular sections one end of said sections having formed thereon a reduced channel shaped extension 14 which is adapted to fit into the adjoining end of the other section. The extensions 14 when thus inserted in the adjacent ends of the adjoining sections of the casing are engaged with tongues 15 formed on one end of stop strips 16 arranged in the sections of the casing 13 and which have formed therein at suitable intervals stop lugs 17. The lugs 17 are adapted to engage similar lugs 18 formed on certain of the outer spring holding plates 9 whereby said outer casing is prevented from turning on the wheel.

In the outer or tread surface of the casing 13 is formed a centrally disposed longitudinal groove or channel 19. With the tread surface of the casing is engaged a clamping band 20 by means of which the sections of the outer casing are held together in operative engagement with the outer ends of the spring and spring holding plates 9. The band 20 has arranged on the inner side a reinforcing strip 21 which seats into the channel 19 thus permitting the band 20 to closely engage the outer surface of the sections of the casing. The strip 21 is of such length that when the band is engaged with the outer surface of the casing the ends of the strip will just meet. The band 20 is of considerably greater length than the strip 21 and one end of the band is inserted between the opposite end thereof and the adjacent end of the strip, said ends of the bands thus overlapping and forming an interlocking connection between themselves and the ends of the strip. When thus engaged the ends of the band and strip are riveted or otherwise securely fastened together and thus hold the sections of the outer tire casing in operative engagement with the springs as shown.

A tire constructed as herein shown and described may be engaged with the rim of any kind of a vehicle wheel or if desired may be formed as a part of the wheel, the inner casing when thus arranged serving as the wheel rim.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A resilient tire for vehicle wheels comprising an inner casing, a series of radially projecting inner spring holding plates secured to said casing, a series of guide plates arranged in said casing between said inner spring holding plates, a series of coiled springs arranged between said holding plates and engaged with said guide plates, a series of outer holding plates adapted to be engaged with the outer ends of said springs whereby the latter are connected and held in position in said casing, an outer casing adapted to be engaged with the outer ends of said springs, and means to hold said casing in operative engagement with the springs.

2. A resilient tire for vehicle wheels comprising an inner casing, a series of radially projecting inner spring holding plates secured to said casing, a series of guide plates arranged in said casing between said inner spring holding plates, a series of coiled springs arranged between said holding plates and engaged with said guide plates, a series of outer holding plates adapted to be engaged with the outer ends of said springs whereby the latter are connected and held in position in said casing, a series of chains to connect said outer spring holding plates with said inner plates, an outer casing formed in detachably connected sections adapted to be engaged with the outer ends of said springs, and means to hold said sections of the outer casing in operative engagement with the springs.

3. A resilient wheel comprising an inner channel shaped casing, a series of spring holding plates having right angularly formed inner ends secured to the inner wall of said casing to form spring engaging seats, a series of spring guiding plates engaged with said seats having formed thereon spring engaging lugs, a series of coiled springs having their inner ends engaged with said seats and the lugs formed on said guide plates, a series of outer holding plates having on their opposite ends right angularly formed spring engaging lugs, a series of springs connected to said inner and outer plates whereby the latter are held in operative engagement with the springs, stop lugs formed on a part of said outer spring holding plates, an outer channel shaped casing formed in detachably connected sections, a series of stop lugs arranged in said outer casing and adapted to engage the lugs on said plates whereby said outer casing is prevented from turning on said springs, and a clamping band arranged around said outer casing whereby the sections thereof are held together and in operative engagement with the springs.

4. In a resilient wheel, an inner channel shaped casing, a series of radially projecting springs arranged in said casing, an outer casing formed in separable channel shaped sections, reduced extensions arranged on one end of said sections and adapted to fit into the adjacent ends of the adjoining section, said outer sections of the casing having formed in their tread surfaces a longitudinal channel, a clamping band adapted to be engaged with said tread surface of the outer casing, a reinforcing strip arranged on the inner side of said clamping band and adapted to fit into the channel of the tread surface of said outer casing, the ends of said clamping band and reinforcing strip having an overlapping interlocking engagement whereby the sections of the outer casing are held in operative engagement with the springs.

In testimony whereof I have hereunto set my hand in presence of two subscribing witnesses.

GEORGE W. ROWELL.

Witnesses:
  D. L. R. HOUGH,
  W. M. VANCE.

---

Copies of this patent may be obtained for five cents each, by addressing the "Commissioner of Patents, Washington, D. C."